United States Patent [19]
Andrews et al.

[11] Patent Number: 5,309,358
[45] Date of Patent: May 3, 1994

[54] METHOD FOR INTERCHANGE CODE CONVERSION OF MULTI-BYTE CHARACTER STRING CHARACTERS

[75] Inventors: Greg P. Andrews; Chang-Ming Wang, both of Rochester, Minn.

[73] Assignee: International Business Machines Corporation, Armonk, N.Y.

[21] Appl. No.: 837,228

[22] Filed: Feb. 18, 1992

[51] Int. Cl.$^5$ .............................................. G06F 15/38
[52] U.S. Cl. ........................... 364/419.01; 364/228.2; 395/775
[58] Field of Search ............ 364/419, 200, 900, 228.2, 364/224.2, 927.2; 341/95; 395/775

[56] References Cited
U.S. PATENT DOCUMENTS

| | | | |
|---|---|---|---|
| 4,559,614 | 12/1985 | Peek et al. | 364/900 |
| 4,701,746 | 10/1987 | Ueda et al. | 341/85 |
| 4,858,114 | 8/1989 | Heath et al. | 364/200 |

*Primary Examiner*—Roy N. Envall, Jr.
*Assistant Examiner*—Khai Tran
*Attorney, Agent, or Firm*—Paul W. O'Malley; Andrew J. Dillon; Curtis G. Rose

[57] ABSTRACT

Conversion of a double-byte representation of a character in a first interchange code to a double-byte representation of the character in a second interchange code is taught. The double-byte representation is used to provide column and row indices into a conversion array. This occurs through comparison of the first and second bytes of the representation to first and second national language verification arrays, respectively. The first byte is compared against the first national language verification array to return a first value. The second byte is compared against the second national language verification array to return a second value. The first and second values are then evaluated against first and second range limits, respectively, which, if met, validate the returned values as indices into a national double-byte translation table.

16 Claims, 4 Drawing Sheets

METHOD FOR INTERCHANGE CODE CONVERSION OF MULTI-BYTE CHARACTER STRING CHARACTERS

BACKGROUND OF THE INVENTION

1. Technical Field

The invention relates to information interchange between data processing systems and, more particularly, to conversion of strings of an N-byte sparse data set to other N-byte strings in another sparse data set. Still more particularly, the invention relates to methods for conversion of double-byte character strings between any 16-bit data code to another 16-bit data code, such as between IBM Host Code and IBM PC Code.

2. Description of the Related Art

Information interchange between data processing systems requires consistency in application of meaning to the symbolic code exchanged. Several interchange codes are in common use and thus the need to convert between these codes frequently arises. For example, one interchange code, IBM PC Code, is used in IBM PS/2 Model 55 personal computers. IBM PC Code is an extension of the American National Standard Code for Information Interchange ("ASCII") to cover written Japanese. Another interchange code, IBM Host Code, is used in various mid-range and main frame systems manufactured by International Business Machines Corporation. IBM Host Code is a similar extension of Extended Binary-Coded Decimal Interchange Code ("EBCDIC").

Information interchange codes define character sets for national languages. The necessary symbols or characters are relatively few in number in most languages. English, for example, uses only 26 Roman letters, each of which has an upper case and a lower case representation, for 52 symbols. German requires the addition of only 7 symbols, allowing for three vowels receiving diacritics (both in upper case and lower case) and the Greek lower case beta symbol. Similar minor additions allow French, Dutch, Spanish, Italian, Portuguese and the Scandinavian languages to be written, all with one code set. 10 digits allow expression of all numbers. There is room for a variety of punctuation symbols and other specialized symbols, such as various national monetary symbols (e.g. $, £, ¥). In all it has been found sufficient to provide 256 bytes of 8 bits each to express all of these characters. Two sets of standard interchange codes exist for each of the single-byte languages. They include the American National Standard Code for Information Interchange ("ASCII") and the Extended Binary-Coded Decimal Interchange Code ("EBCDIC"). Conversion from one interchange code to another for the single-byte language has required provision of a single 256 byte conversion table.

Unlike most languages, Chinese, Japanese, and Korean contain more than 256 characters. Traditional written Chinese utilizes in excess of 13,000 ideographs. Japanese utilizes between 3,000 and 8,000 ideographs (kanji characters) and several hundred other symbols for the numerical, hiragana and katakana characters. Conversion between interchange codes is further complicated by the fact that the ideograph sets for Japanese, Korean, Traditional Chinese and Simplified Chinese differ in content and size. To handle such large character bases, the interchange code sets for these languages use a double-byte of 16 bits for each character. This allows the expression of some 65,536 characters ($2^{16}$).

The double-byte character sets have been organized in several different ways. For Japanese, four different character sets are in current use in various computers. Korean uses five sets, and Traditional Chinese uses two sets. By way of example, one kanji symbol, the one for "LARGE", is '455B' in IBM Host Code, '91E5' in IBM PC Code, '1371' in Kanji Assigned Number Code, and '3471' in JIS (Japanese Industrial Standard) Code. The numbers are all hexadecimal representations.

In theory, a method similar to that used for conversion between single-byte interchange codes could be used in double-byte conversion. Unfortunately, in application, such an approach would take up considerably more memory than for a single-byte language. A conversion table for the single-byte language is only 256 bytes in length. A conversion table for just one double-byte language would be in excess of 128 Kilobytes in length.

The traditional methods for double-byte character set ("DBCS") conversion utilize a series of language dependent comparisons against the individual double-byte characters to determine their validity. These steps are in essence a series of range comparisons. Once the validity of the character has been established, a language dependent method is utilized to derive array indices for the character into a 256 entry by 256 entry conversion array of double-bytes. The array indices are then utilized to recover the appropriate character from the translation array.

Although not directed to conversion between interchange codes, U.S. Pat. No. 4,701,746 to Ueda et al. teaches a method which has applicability to simplification of the range comparison and indices generating portions of the traditional method. Ueda et al. teach a code converting device for converting code signals of 16 bits to code signals of 13 bits. Ueda et al. basically allow for the conversion of a series of sparse data items into consecutive references. The teaching exploits the fact that notwithstanding the large character set size for Japanese, it requires use of no where near 128 Kbytes of memory space for complete table of double-byte characters. However, Ueda et al. can deal with a maximum of about 8,000 data items. Therefore, Ueda et al. cannot be applied to either traditional or simplified Chinese. Nor is Ueda et al. of general application to multiple byte systems. Ueda et al. provides limited error checking capacity compared to the present invention.

SUMMARY OF THE INVENTION

It is therefore one object of the present invention to provide a method for information interchange between data processing systems.

It is another object of the present invention to provide a method for conversion of double-byte character strings ("DBCS") from one interchange code to another.

It is still another object to provide a method for conversion of double-byte character strings between the IBM PC Code and the IBM Host Code.

It is yet another object of the invention to provide a single method for conversion of characters, represented by double-byte character strings, for a plurality of national languages.

The foregoing objects are achieved as is now described. Conversion of a double-byte representation of a character in a first interchange code to a double-byte representation of the character in a second interchange code recovered from a double-byte conversion array is provided by generation of column and row indices into the array from the first and second bytes of the character representation in the first code. First and second national language verification arrays for a first byte and a second byte, respectively, of the double-byte representation for the character in the first interchange code are provided for this purpose. The first byte is compared against the first national language verification array to return a first value. The second byte is compared against the second national language verification array to return a second value. The first and second values are then evaluated against first and second range limits, respectively, which, if met, validate the returned values as indices into a national double-byte conversion table.

Responsive to return of the first value within a first range limit and return of the second value within a second range limit, the first and second values are used as index values into the double-byte conversion table. The index value is then used to recover a double-byte representation for the character in the second interchange code. Otherwise, responsive to return of an out of range limit value from the evaluation step for the second byte, an invalid indication is returned. Responsive to return of an out of range limit value from the evaluation step for the first byte and to return of a value within the range limit for the second byte, the value returned for the first byte is compared against an invalid character value, a special processing character value, and a reserved character value and returns one of the values as an output of the translation process.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
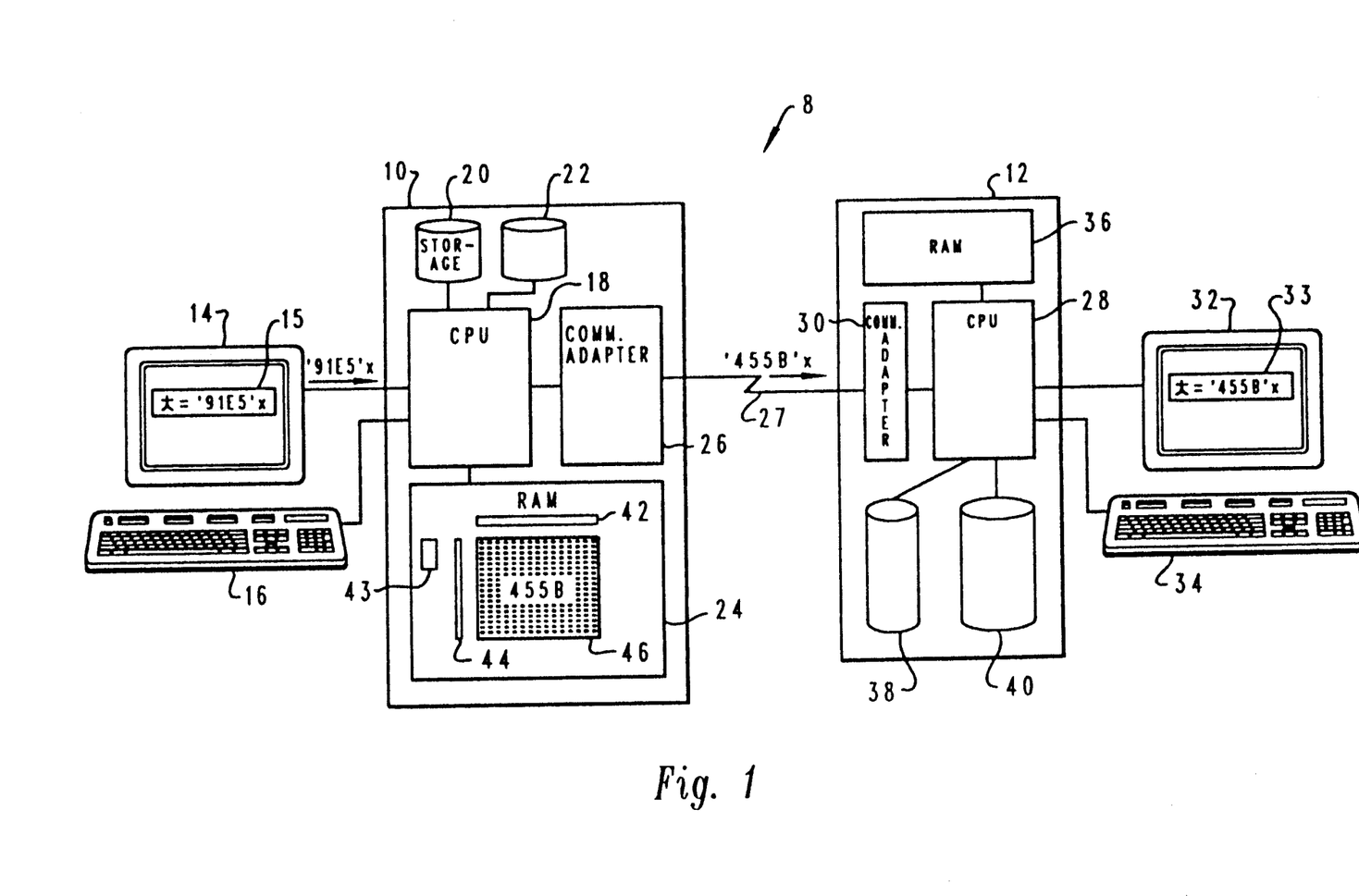
FIG. 1 depicts a block diagram of a distributed data processing system.

With reference now to the figures and in particular with reference to FIG. 1, there is depicted a block diagram representation of a distributed data processing system 8 which may be utilized to implement the method and system of the present invention. As may be seen, distributed data processing system 8 may include a personal computer system 10, preferably provided by a PS 55 personal computer available from International Business Machines Corporation and a midrange computer system 12 such as an AS/400 also available from International Business Machines Corporation. A user interface for personal computer system 10 includes a video display device 14 and a keyboard 16. The kanji character representing the concept "LARGE" and its extended ASCII or IBM PC Code hexadecimal double-byte character string "91E5"$_{hex}$ are depicted in box 15 on video display device 14.

Personal computer system 10 is functionally illustrated. Display device 14 is under the control of central processor 18 within computer 10. A keyboard provides for user inputs to computer 10. Also accessible to central processor 18 are direct access storage devices 20 and 22 and a system memory 24. A communications adaptor 26 provides an interface to a channel link 27 over a network between computer system 10 and computer system 12.

Computer system 12 operates as a host device serving network terminals such as computer system 10. Computer system 12 includes a central processor 28, which receives data over communications link 27 through a communications adaptor 30. Central processor 28 controls a display device 32 and receives user inputs through a keyboard 34. Displayed in a box 33 on display device 32 is the kanji character for "large" and its IBM Host Code double-byte character string "455B"$_{hex}$. Computer system 12 further includes system memory 36, and direct access storage devices 38 and 40.

Character strings transmitted between computer system 10 and computer system 12 must be converted between interchange codes if information represented by the strings is not to be lost or completely garbled. Conversion of the character string for the kanji character for "LARGE" will be considered. In the preferred embodiment such conversion occurs in the terminals of a network, e.g. in personal computer system 10. Resident in system memory 24 for computer system 10 are a program 43 for the conversion of IBM PC Code double-byte character strings to IBM Host Code double-byte character strings, a first byte verification table 42, a second byte verification table 44, and a conversion table 46, all for use by the conversion program.

Figure 2:
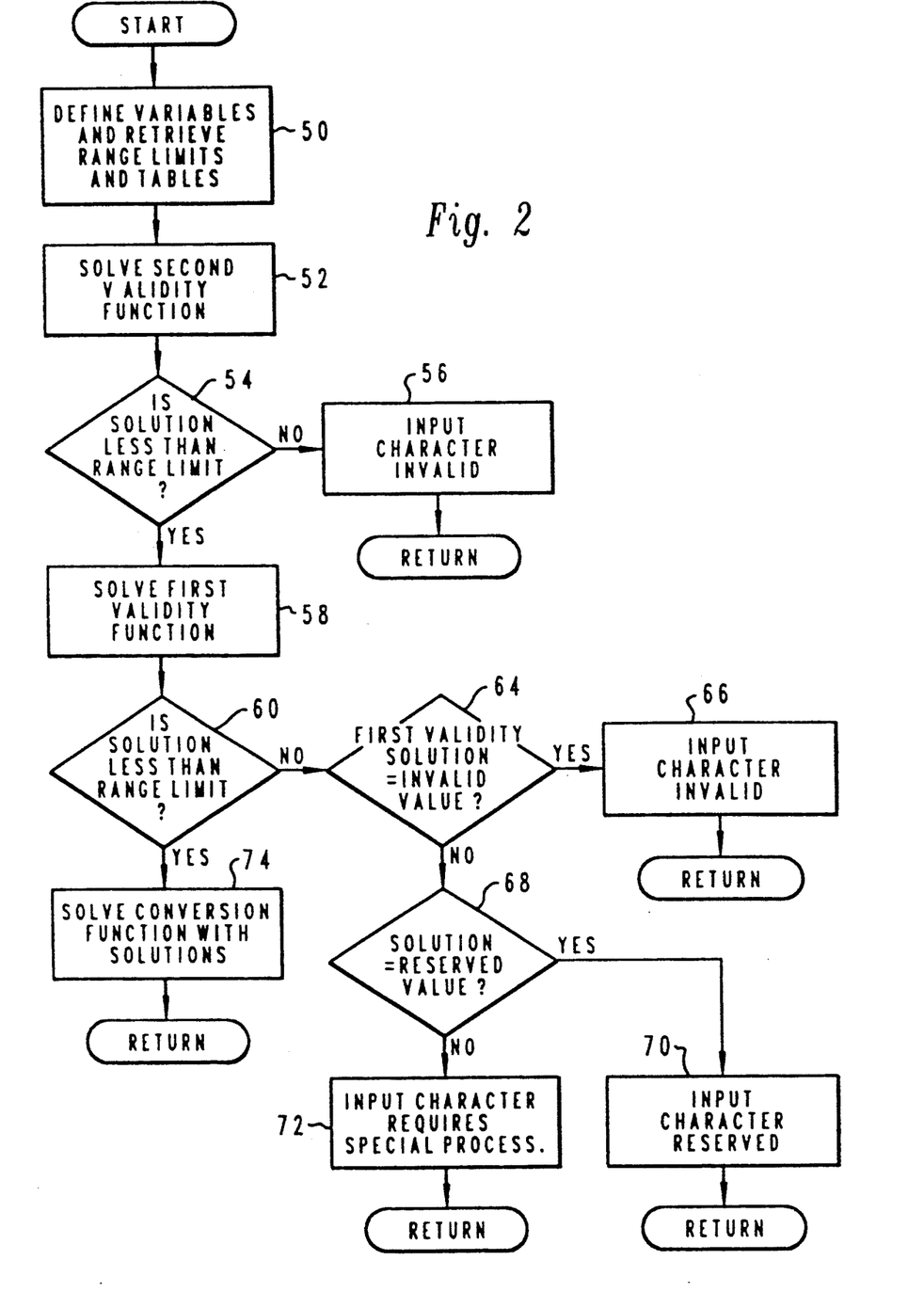
FIG. 2 is a flow chart illustrating the conversion method of the present invention applied to double-byte characters.

Referring now to FIG. 2, there is depicted a flow chart which illustrates the conversion method of the present invention. The process begins upon receipt of a character, coded as a double-byte character string, in a source interchange code. Identification of a target code is determined from identification of a destination machine. At step 50 two variables, Index1 and Index2 are defined and the appropriate tables, range limits, and trigger values for special functions for conversion from the source to the target interchange code, are retrieved from a direct access storage device 20 or 22 and placed in system memory 24. While one program is used for all languages and all interchange codes, the tables, range limits and possibly the trigger values are particular to one national language and the interchange codes. The trigger values equal or exceed the maximum hexadecimal value (the range limit) for valid indices in each of two verification tables of 256 bytes each. Tables 1–4 below are exemplary tables for use in translating Japanese characters from IBM PC Code to IBM Host Code representation.

Table 1 provides the routine a plurality of trigger values all of which at least equal or exceed the range limit value of $0 \times F0_{hex}$.

TABLE 1

| CONST |
| --- |
| _i_ = "FF"$_{hex}$ (* invalid *) |
| _r_ = "FE"$_{hex}$ (* reserved *) |
| _s_ = "FD"$_{hex}$ (* special *) |

A second byte verification table, consisting of 256 bytes, is used to implement one of two verification functions. Step 52 indicates solution of the verification function utilizing the second byte verification table. The verification function:

$$Index2 = v_2(a_2) \tag{1}$$

where $a_2$ is the second byte of the double-byte character string, is a table look up operation using the second byte as an address into the second byte verification array to return a value for Index2. Either a valid index value or a trigger value indicating an invalid character is returned from the operation. An exemplary verification table for the second byte is reproduced in Table 2.

TABLE 2

Verify2: ARRAY [$00..$FF] OF BYTE = (

| | | | | | | | | | |
| --- | --- | --- | --- | --- | --- | --- | --- | --- | --- |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |
| $00, | $01, | $02, | $03, | $04, | $05, | $06, | $07, | $08, | $ |
| 09, | $0A, | $0B, | $0C, | $0D, | $0E, | $0F, | | | |
| $10, | $11, | $12, | $13, | $14, | $15, | $16, | $17, | $18, | $ |
| 19, | $1A, | $1B, | $1C, | $1D, | $1E, | $1F, | | | |
| $20, | $21, | $22, | $23, | $24, | $25, | $26, | $27, | $28, | $ |
| 29, | $2A, | $2B, | $2C, | $2D, | $2E, | $2F, | | | |
| $30, | $31, | $33, | $33, | $34, | $35, | $36, | $37, | $38, | $ |
| 39, | $3A, | $3B, | $3C, | $3D, | $3E, | _i_, | | | |
| $3F, | $40, | $41, | $42, | $43, | $44, | $45, | $46, | $47, | $ |
| 48, | $49, | $4A, | $4B, | $4C, | $4D, | $4E, | | | |
| $4F, | $50, | $51, | $52, | $53, | $54, | $55, | $56, | $57, | $ |
| 58, | $59, | $5A, | $5B, | $5C, | $5D, | $5E, | | | |
| $5F, | $60, | $61, | $62, | $63, | $64, | $65, | $66, | $67, | $ |
| 68, | $69, | $6A, | $6B, | $6C, | $6D, | $6E, | | | |
| $6F, | $70, | $71, | $72, | $73, | $74, | $75, | $76, | $77, | $ |
| 78, | $79, | $7A, | $7B, | $7C, | $7D, | $7E, | | | |
| $7F, | $80, | $81, | $82, | $83, | $84, | $85, | $86, | $87, | $ |
| 88, | $89, | $8A, | $8B, | $8C, | $8D, | $8E, | | | |
| $8F, | $90, | $91, | $92, | $93, | $94, | $95, | $96, | $97, | $ |
| 98, | $99, | $9A, | $9B, | $9C, | $9D, | $9E, | | | |
| $9F, | $A0, | $A1, | $A2, | $A3, | $A4, | $A5, | $A6, | $A7, | $ |
| A8, | $A9, | $AA, | $AB, | $AC, | $AD, | $AE, | | | |
| $AF, | $B0, | $B1, | $B2, | $B3, | $B4, | $B5, | $B6, | $B7, | $ |
| B8, | $B9, | $BA, | $BB, | _i_, | _i_, | _i_): | | | |

At step 54 the value Index2 is compared with the range limit for the array to determine if a valid character input was received. If the trigger value was returned for Index2 the variable exceeds the range limit and an invalid indication is given at step 56. No further operations relating the particular character are taken. If the value for Index2 indicates a valid character, then, at step 58 a verification function $v_1$ is solved for Index1.

Table 3 is named VERIFY1 and is a verification array taking the first byte of eight bits from the double-byte character string as an input variable. The verification function:

$$Index1 = v_1(a_1), \tag{2}$$

where $a_1$ is the first byte of the double-byte character string, is a table look up operation using the first byte as an address into the verification array to return a value for Index1. The verification table for $a_1$ differs somewhat from the table for $a_2$. If _i_ ("FF"$_{hex}$) returned from the table, the entire double-byte character string is invalid. If the table returns _r_ ("FE"$_{hex}$), the character is reserved, which indicates the character might be valid in the future but is not today. If the table returns _s_ ("FD"$_{hex}$), the character indicates special processing is required. "Special Processing" can be used instead of this invention to perform conventional, well known conversion, such as conversions for user defined characters or for certain ranges of Chinese characters that can be converted simply.

TABLE 3

Verify1: ARRAY [ $00..$FF ] OF BYTE = (

| | | | | | | | | | |
| --- | --- | --- | --- | --- | --- | --- | --- | --- | --- |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |
| _i_, | _i_, | _i_, | _i_, | _i_, | _i_, | _i_, | _i_, | _i_, | — |
| _i_, | _i_, | _i_, | _i_, | _i_, | _i_, | _i_, | | | |

TABLE 3-continued

Verify1: ARRAY [ $00..$FF ] OF BYTE = (

| _i_, | _i_, | _i_, | _i_, | _i_, | _i_, | _i_, | | |
|---|---|---|---|---|---|---|---|---|
| _i_, | _i_, | _i_, | _i_, | _i_, | _i_, | _i_, | _i_, | _i_, — |
| i_, | _i_, | _i_, | _i_, | _i_, | _i_, | _i_, | | |
| _i_, | $00, | $01, | $02, | $03, | _r_, | _r_, | _r_, | $04, $ |
| 05, | $06, | $07, | $08, | $09, | $0A, | $0B, | | |
| $0C, | $0D, | $0E, | $0F, | $10, | $11, | $12, | $13, | $14, $ |
| 15, | $16, | $17, | $18, | $19, | $1A, | $1B, | | |
| _i_, | _i_, | _i_, | _i_, | _i_, | _i_, | _i_, | _i_, | _i_, — |
| i_, | _i_, | _i_, | _i_, | _i_, | _i_, | _i_, | | |
| _i_, | _i_, | _i_, | _i_, | _i_, | _i_, | _i_, | _i_, | _i_, — |
| i_, | _i_, | _i_, | _i_, | _i_, | _i_, | _i_, | | |
| _i_, | _i_, | _i_, | _i_, | _i_, | _i_, | _i_, | _i_, | _i_, — |
| i_, | _i_, | _i_, | _i_, | _i_, | _i_, | _i_, | | |
| _i_, | _i_, | _i_, | _i_, | _i_, | _i_, | _i_, | _i_, | _i_, — |
| i_, | _i_, | _i_, | _i_, | _i_, | _i_, | _i_, | | |
| $1C, | $1D, | $1E, | $1F, | $20, | $22, | $22, | $23, | $24, $ |
| 25, | $26, | _r_, | _r_, | _r_, | _r_, | _r_, | | |
| _s_13, | _s_13, | _s_13, | _s_13, | _s_13, | _s_13, | _s_13, | _s_13, | _s_13, — |
| s_, | $27, | $28, | $29, | _i_, | _i_, | _i_); | | |

At step 60 it is determined whether the returned value for Index1 is less than the range limit for the array. If it is not, step 64 is next executed, comparing the value of Index1 against the trigger value indicating an invalid character. If Index1 equals the trigger value for invalid characters, step 66 is executed, resulting in generation of an error signal. No further operations relating to the character are executed.

The NO branch from step 64 is taken if Index1 does not equal the trigger value for invalid characters. At step 68 Index1 is compared to the trigger value indicating a reserved value to determine if a reserved value, such as user programmed characters, was received as a character (step 70). Otherwise, a special processing indication is assumed (step 72). Operations associated with return of such special function characters may then be handled.

The YES branch from step 60 takes operation to step 74, which is the actual conversion operation. Index1 and Index2 provide row and column indices into a double-byte conversion array for recovery of the character string for the original character in the new interchange code. Table 4 is a partial reproduction of such an array in which the first hexadecimal number, i.e. the four characters immediately preceeded by the "$" sign are the target IBM Host Code and the second hexadecimal entry within the parenthesis is IBM PC Code and is not part of the array. The second entries would be used for conversion back to IBM PC Code. The return from execution of the conversion function is the new double-byte character string:

RESULT = t(Index1, Index2)     (3)

TABLE 4

Table: ARRAY [ $00..$29, $00..$BB ] OF WORD = ((

| $4040(*8140*), | $4344(8141*), | ... |
|---|---|---|
| $FDFF(*8240*), | $FDFF(*8241*), | ... |
| $4347(*8340*), | $4381(*8341*), | ... |
| $41C0(*8440*), | $41C1(*8441*), | ... |
| ... | | |
| ... | | |
| ... | | |
| $4868(*9140*), | ... | $455B(*91E5*) |
| , | ... | |
| ... | | |
| ... | | |

TABLE 4-continued

Table: ARRAY [ $00..$29, $00..$BB ] OF WORD = ((

...

Table 5 is a pseudo-code program for the foregoing process.

TABLE 5

```
function Translate( c: word ) : word;
var
  Index1,Index2 : BYTE;
begin
  Index2 := Verify2[Byte2(c) ];
  if Index2 < $F0 then
    begin
      Index1 := Verify1[Byte1(c) ];
      if Index1 < $F0 then
        Translate := Table[Index1, Index2 ]
      else
        case Index1 of
          _i_ : Translate := Invalid;
          _r_ : Translate := Reserved;
          _s_ : Translate := Special(c);
        end
    end
  else
    Translate := Invalid;
end;
```

Figure 3:
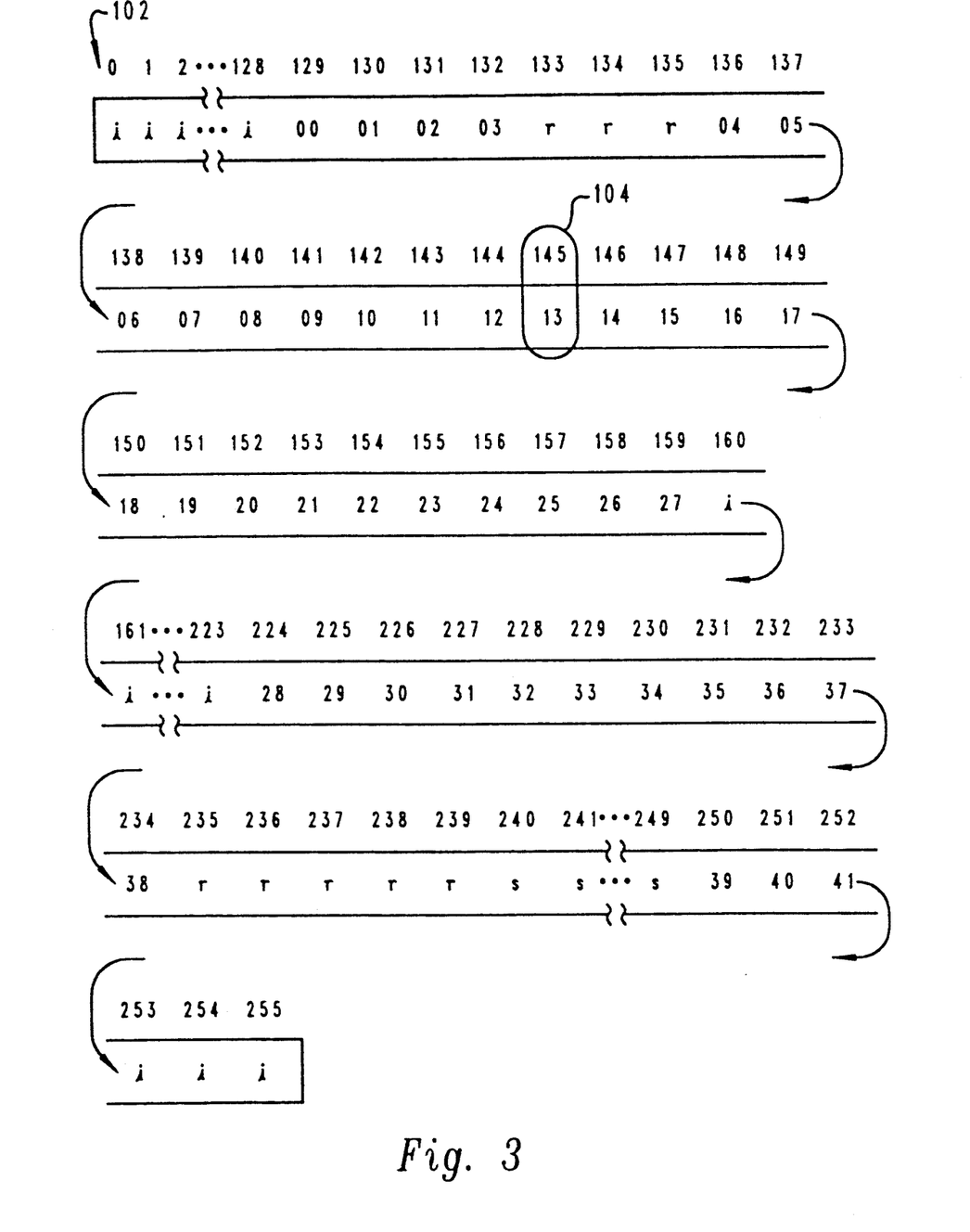
FIG. 3 illustrates a data structure for a verification array for a first byte of a multi-byte character string.
Figure 4:
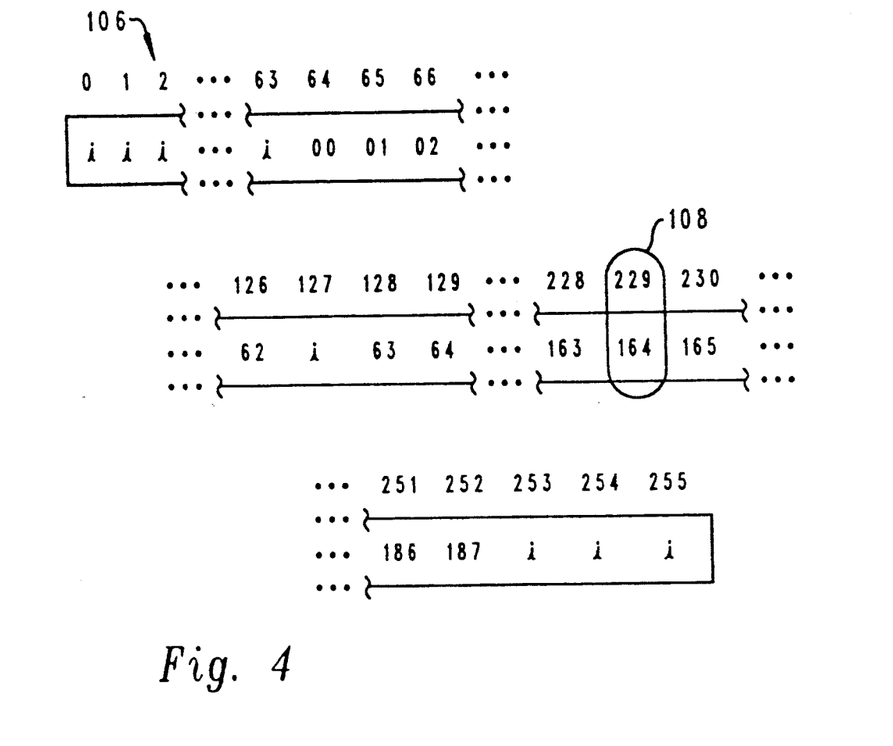
FIG. 4 illustrates a data structure for a verification array for a second byte of a multi-byte character string.
Figure 5:
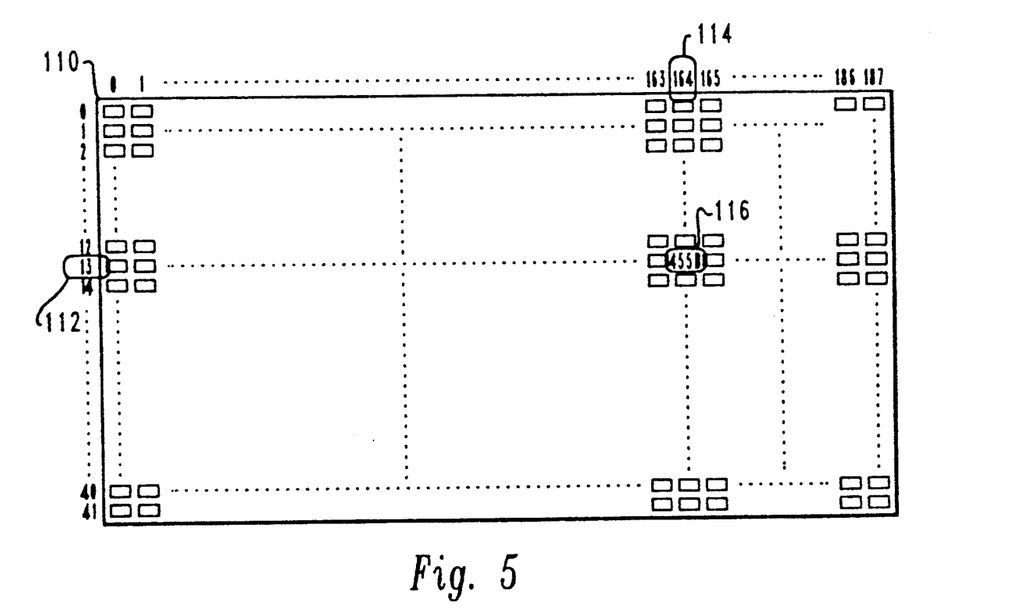
FIG. 5 illustrates a data structure for a conversion array.

Referring now to FIGS. 3 through 5, data structures for conversion of the character string for the kanji character for "large" from the interchange code for computer system 10 to a character string in the interchange code for computer system 12 are illustrated. For simplicity in illustration, the entries in the Figures, which correspond to Tables 2 through 4, are expressed in decimal rather than hexadecimal notation. As noted above, the hexidecimal double-byte character string for the kanji character is "91E5"$_{hex}$. Each byte is treated separately. Thus "91"$_{hex}$ and "E5"$_{hex}$ provide the independent variables for the verification functions. The decimal equivalents for "91"$_{hex}$ and "E5"$_{hex}$ are 145 and 229, respectively.

The verification function for the first byte is determined by data structure 102. The hexidecimal numbers "00" through "FF" convert to the decimal integers 0 through 255. Each of the entries 0 through 255 corresponds to a value, either "i", "r", "s", or "0" through "41". Only one correspondence is allowed for "0" through "41" which are indices into a conversion array. The first byte of the double-byte character string, converted to decimal representation is 145. Corresponding to 145 in the graph is the decimal integer 13, as indicated by block 104, which is returned as the solution for the first verification function.

The verification function for the second byte is determined by data structure 106. Again, the hexidecimal numbers "00" through "FF" convert to the decimal integers 0 through 255. Each of the entries 0 through 255 corresponds to a value, either "i" or "0" through "187". Again, "0" through 187 appear only once each in the data structure. The second byte of the double-byte character string, converted to decimal representation is 229. Corresponding to 229 in the graph is the decimal integer 164, indicated by block 108, which is returned as the solution for the second verification function.

Matrix 110 is the conversion array for Japanese characters, and has 188 columns (numbered 0 through 187) and 42 rows (numbered 0 through 41) to correspond to the range of uniquely assigned verification function results. Unlike Table 4, only IBM Host Code is shown. Thus the solutions for the verification functions, provided they were other than i, r, or s, indicate the row and column of the converted double-byte string. Thus location 116, which is common to row 13 (indicated by numeral 112) and column 164 (indicated by numeral 114) is the desired result, here "455B"hex.

The invention provides a single program, executed utilizing unique national language conversion and verification tables, for character conversion between interchange codes for Korean, Japanese, Traditional Chinese and Simplified Chinese. Further, operations are simplified over traditional methods resulting in reduced operating times to achieve conversion. As may be seen from the data structures of FIGS. 3–5, the conversion and verification tables take far less memory space than 128 Kbytes. The conversion array for the Japanese language, including all kanji, hiragana katakana and numeric characters, and the two verification arrays for one way conversion occupy only 16,304 bytes of memory.

While the invention has been shown to convert double-byte character representations from one interchange code to another, the bytes that are converted need not represent displayable characters. The bytes may represent items from any set of meaningful values. The advantage of this invention comes when the meaningful values are not consecutive. Just as the invention teaches a method for converting double-byte values, the invention can be expanded to convert multiple-byte values from one data set to another. The double-byte conversion uses two verification arrays and a two-dimensional conversion array. A triple-byte conversion method would use three verification arrays and a three-dimensional conversion array. This can be expanded to any n-byte conversion.

While the invention has been particularly shown and described with reference to a preferred embodiment, it will be understood by those skilled in the art that various changes in form and detail may be made therein without departing from the spirit and scope of the invention.

What is claimed is:

1. A method of converting a multiple byte dataword in a first extended interchange code to a multiple byte dataword in a second extended interchange code, the method comprising the steps performed by a computer of:

verifying each byte of the multiple byte dataword in said first extended interchange code utilizing each of a plurality of separate verification arrays associated with each byte position;

returning an index value for each of the bytes of said multiple byte dataword in said first extended interchange code from the respective associated verification arrays in response to a successful verification thereof; and utilizing a plurality of the returned index values to access the multiple byte dataword in the second extended interchange code from a multiple dimension conversion matrix.

2. A method of converting a multiple byte dataword in a first extended interchange code to a multiple byte dataword in a second extended interchange code as set forth in claim 1, wherein the step of verifying each of the byte includes the steps for each of the bytes of:

utilizing said byte as an index into the separate verification array associated with the byte position;

returning a numerical value from said separate verification array;

comparing said returned numerical value against range limits; and in response to said returned numerical value meeting said range limits indicating the successful verification allowing the method to utilize said returned numerical value as an index value.

3. A method of converting a multiple byte dataword in a first extended interchange code to a multiple byte dataword in a second extended interchange code as set forth in claim 2, wherein said datawords correspond to a character in a written national language.

4. A method of converting a multiple byte dataword in a first extended interchange code to a multiple byte dataword in a second extended interchange code as set forth in claim 3, wherein said multiple byte datawords consist of first and second bytes.

5. A method of converting a multiply byte dataword in a first extended interchange code to a multiple byte dataword in a second extended interchange code as set forth in claim 2, and further comprising the step of:

in response to said returned numerical value falling outside of the range limits, indicating an unsuccessful verification.

6. A method of converting a multiple byte dataword in a first extended interchange code to a multiple byte dataword in a second extended interchange code as set forth in claim 5, and further comprising the step of:

in response to an unsuccessful verification, determining from said returned numerical value if special processing is required.

7. A method of converting a multiple byte dataword in a first extended interchange code to a multiple byte dataword in a second extended interchange code as set forth in claim 6, wherein said datawords correspond to a character in a written national language.

8. A method of converting a multiple byte dataword in a first extended interchange code to a multiple byte dataword in a second extended interchange code as set forth in claim 7, wherein said multiple byte datawords consist of first and second bytes.

9. A computer system for converting a first multiple byte dataword in a first code to a second multiple byte dataword in a second code, the computer system comprising:

means for verifying each byte of the multiple byte dataword in said first code utilizing each of a plurality of separate verification arrays associated with each byte position;

means for returning an index value for each of the bytes of said multiple byte dataword in said first code from said associated separate verification array in response to a successful verification of the bytes; and means for utilizing a plurality of returned index values to access a multiple byte dataword in a second code from a multiple dimension conversion matrix.

10. A computer system as set forth in claim 9, wherein said means for verifying further comprises:

means for utilizing the bytes as indices into said separate verification arrays associated with each of said byte positions;

means for returning numerical values from said associated separate verification arrays for each of the bytes;

means for comparing the returned numerical values from said returning means against at least a first range limit; and means responsive to said returned numerical values being within said at least first range limit for indicating a successful verification and qualifying said returned numerical value as an index value.

11. A computer system as set forth in claim 10, wherein said datawords correspond to a character represented by an interchange code for a written national language.

12. A computer system as set forth in claim 11, wherein said multiple byte datawords in both said first code and in said second code are of two bytes length.

13. A computer system as set forth in claim 10, said computer system further comprising:

means responsive to said returned numerical values equalling or exceeding said at least first range limit for indicating an unsuccessful verification.

14. A computer system as set forth in claim 13, said computer system further comprising:

means responsive to an unsuccessful verification for determining from said returned numerical value whether special processing is required.

15. A computer system as set forth in claim 14, wherein said datawords correspond to a character in a written national language.

16. A computer system as set forth in claim 15, wherein said multiple byte datawords in said first code and in said second code are double byte representations.

* * * * *